United States Patent [19]
Liebrecht

[11] 3,837,030
[45] Sept. 24, 1974

[54] GROUND TREATING APPARATUS

[75] Inventor: Heinrich Fritz Liebrecht, Norfolk, England

[73] Assignee: Leeford (London) Limited, London, England

[22] Filed: Mar. 19, 1973

[21] Appl. No.: 342,527

[52] U.S. Cl. .................................................. 15/82
[51] Int. Cl. ........................................... E01h 1/05
[58] Field of Search ..................... 15/82–87, 79, 15/340; 56/397; 172/122, 123

[56] References Cited
UNITED STATES PATENTS

| | | |
|---|---|---|
| 2,229,229 | 1/1941 | Wagner ............................ 15/82 |
| 2,229,230 | 1/1941 | Wagner ............................ 15/82 |
| 2,235,277 | 3/1941 | Bradley ........................... 15/82 |
| 2,248,012 | 7/1941 | Phillips ............................ 15/82 |

*Primary Examiner*—Edward L. Roberts
*Attorney, Agent, or Firm*—William Anthony Drucker

[57] ABSTRACT

The invention relates to a rotary brush or like ground treating apparatus in which the brush or the like is mounted on a frame which is carried by means such as pivotal arms for attachment to the ball jointed links of a tractor so that either end of the frame can move vertically independently of the other end.

2 Claims, 1 Drawing Figure

3,837,030
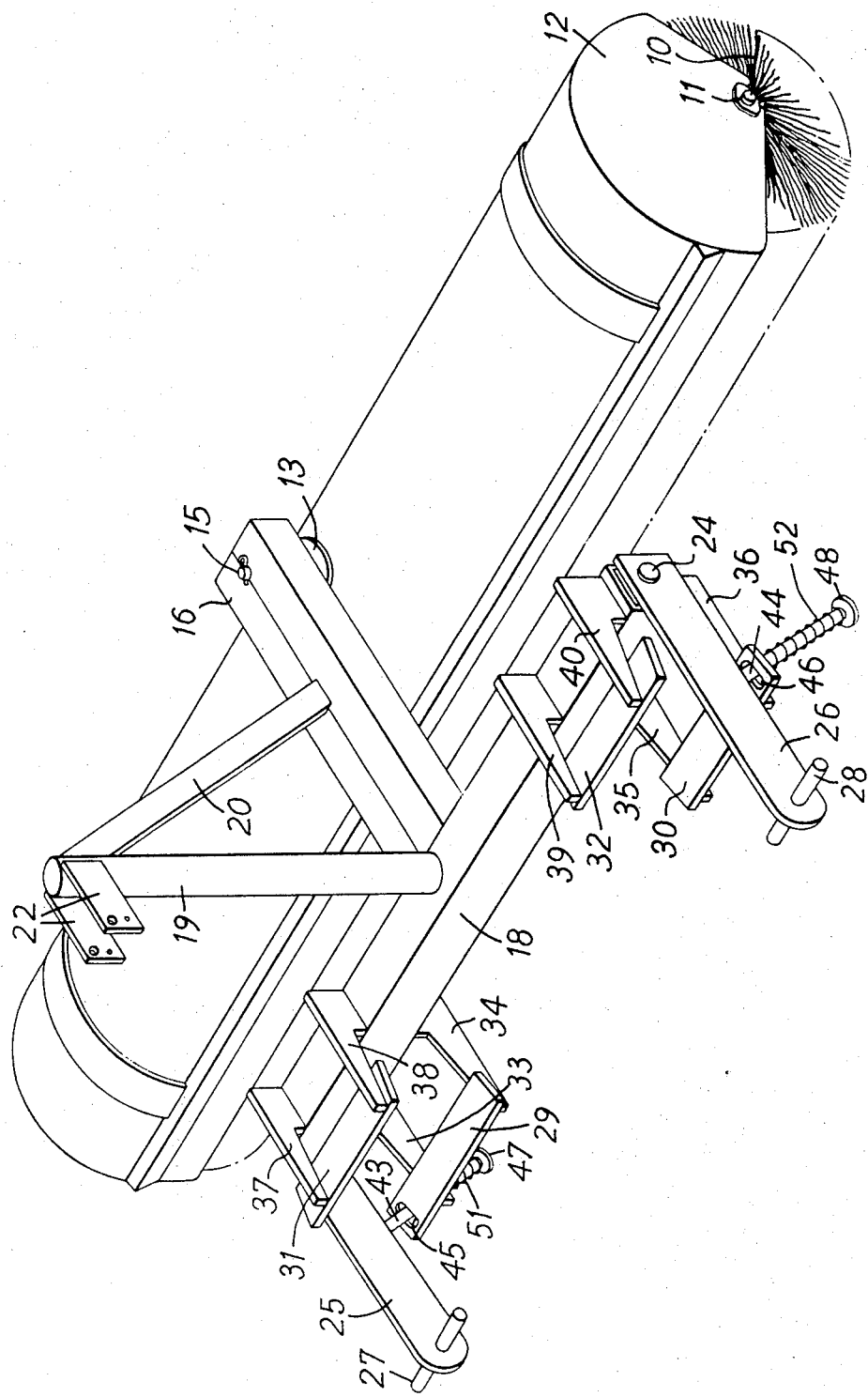

GROUND TREATING APPARATUS

This invention relates to ground treating apparatus such as rotary road sweeping brush apparatus and similar apparatus carrying ground engaging devices which are moved along the ground and have considerable transverse dimensions.

Such apparatus is commonly mounted on a tractor by a three point linkage system and it is found that when the device goes over a hump on the ground it has a tendency to lift the device which then does not act on the ground. Such devices also do not adequately follow contours of the ground surface.

According to the present invention the device is mounted on a frame which is carried by means which permit the frame to move vertically and to tilt laterally, i.e., so that either end can move vertically independently of the other end.

In a constructional form of the invention the frame carries laterally disposed axle means on which two laterally spaced apart pivotal arms are mounted which extend rearwardly and are adapted at their rear ends to be mounted on the tractor, said frame also having means for attachment to a third position on the tractor.

The axle means may be a continuous rod which partly offsets the gravitational tendency of the device to tilt laterally and thus provides a smooth action.

One form of the invention will now be described by way of example with reference to the accompanying drawing.

The ground engaging device in this case is shown as a rotary road sweeping brush 10 carried on a spindle 11 which is mounted in a housing 12 and is driven by any suitable means. The housing 12 has a plate 13 welded to it at its mid-position of its length and this plate carries an upstanding pin 15. The forward end of an inverted channel girder member 16 seats on the plate 13 and has an aperture engaged by the pin 15. The member 16 is disposed fore and aft and its rear end is welded to the middle part of a transverse inverted channel girder member 18. The member 18 carries an upstanding mast 19 at its middle position and the mast is reinforced by a strut 20 attached to the member 16. The upper end of the mast carries lugs 22 apertured for attachment to the usual ball-jointed top link of a hydraulic linkage system on a tractor whereby the brush can be lifted off the ground.

The parts 12 to 22 serve as a frame which carries the brush.

Mounted within the member 18 (by means not shown) and free to rotate therein is a transverse rod or axle 24. A pair of arms 25,26 extend fore and aft and are spaced apart transversely and at their forward ends are mounted on the rod 24 fixed to the rod. The arms 25,26 are fixed to the axle 24 so that the latter acts as a torsion bar. The rear ends of the arms carry transverse pins 27,28 for attachment pivotally to the usual ball jointed bottom links of said linkage system of the tractor. Bottom stop plates 29,30 and top stop plates 31,32 are carried by lugs 33,34; 35,36; 37,38; 39,40; all of which lugs are welded to the member 18. These stop plates are engageable by the arms 25,26 to limit their lower and upper positions.

The arms 25,26 carry rods 43,44 which extend through apertures 45,46 in the lower stop plates and have stops 47,48 at their lower ends. Springs 51,52 surround the rods 43,44 and are in compression between the plates and the stops 47,48 so as to act as shock absorbers.

I claim:

1. A ground treating apparatus comprising a ground treating device extending transversely of the forward direction of the apparatus, a housing (12) over said device and carrying said device, a frame (16, 18) carrying said housing, a torsion bar (24) carried rotatably by said frame transversely of said forward direction, a pair of arms (25, 26) disposed fore and aft of the apparatus and attached at their forward ends to the opposite ends of said torsion rod, means (27, 28) at the rear ends of the said arms for attachment pivotally to the bottom links of a tractor linkage system, an upstanding element (19) carried by the frame, and means (22) at the upper end of said element for attachment to the top link of said tractor linkage system.

2. A ground treating apparatus comprising a rotary brush (10), an axle (11) carrying the brush and disposed transversely of the forward direction of the apparatus, a brush housing (12) located over the brush and carrying said axle, a first girder member (16) located fore and aft of the apparatus between the ends of the housing and carrying said housing at its forward end, a second girder member (18) disposed transversely of the apparatus and mounted on the rear end of the first girder member (16), a torsion rod (24) located transversely of the apparatus and mounted rotatably on said second girder member (18), a pair of arms (25, 26) disposed fore and aft of the apparatus and fixed at their forward ends to the ends of the torsion rod respectively, means (27, 28) on the rear ends of said arms for attachment to the bottom links of a tractor linkage system, stop means (29, 30, 31, 32) for limiting the up and down movements of the arms, shock absorbing means (43, to 52) acting on said arms for cushioning the upward movement of the arms, an upstanding mast (19) mounted on said second girder member (18), and means (22) at the upper end of said mast for attachment to the top link of said tractor linkage system.

* * * * *